United States Patent
Benecke et al.

(10) Patent No.: US 8,704,480 B2
(45) Date of Patent: Apr. 22, 2014

(54) METHOD FOR THE OPERATION OF SYNCHRONOUS MOTORS, AND ASSOCIATED DEVICE

(75) Inventors: Marcel Benecke, Magdeburg (DE); Diethard Runggaldier, Stegaurach (DE)

(73) Assignee: Siemens Aktiengesellschaft, Munich (DE)

( * ) Notice: Subject to any disclaimer, the term of this patent is extended or adjusted under 35 U.S.C. 154(b) by 506 days.

(21) Appl. No.: 13/129,426

(22) PCT Filed: Oct. 30, 2009

(86) PCT No.: PCT/EP2009/064372
§ 371 (c)(1),
(2), (4) Date: May 16, 2011

(87) PCT Pub. No.: WO2010/054940
PCT Pub. Date: May 20, 2010

(65) Prior Publication Data
US 2011/0225442 A1 Sep. 15, 2011

(30) Foreign Application Priority Data
Nov. 17, 2008 (DE) .......................... 10 2008 057 701

(51) Int. Cl.
*H02P 25/00* (2006.01)
*H02P 23/00* (2006.01)
*H02P 1/26* (2006.01)
*H02P 1/16* (2006.01)

(52) U.S. Cl.
USPC ........................................................ 318/778

(58) Field of Classification Search
USPC ................................................ 318/778, 154
See application file for complete search history.

(56) References Cited

U.S. PATENT DOCUMENTS

| | | | | |
|---|---|---|---|---|
| 5,883,486 A | * | 3/1999 | Earhart et al. | ................ 318/778 |
| 5,886,555 A | * | 3/1999 | Bildgen et al. | ................ 327/175 |
| 6,104,177 A | | 8/2000 | Fritsch et al. | |
| 2003/0090222 A1 | * | 5/2003 | Charleston | .................... 318/254 |

(Continued)

FOREIGN PATENT DOCUMENTS

| | | |
|---|---|---|
| DE | 3427479 A1 | 2/1986 |
| DE | 19641832 C1 | 4/1998 |

(Continued)

OTHER PUBLICATIONS

Brosch, Peter F.: Moderne Stromrichterantriebe, Würzburg, Verlag Vogel 2002, ISBN 3-8023-1887-0, 4. Auflage, S. 171; Magazine.
German priority document DE 10 2008 057 701.4, filed Nov. 17, 2008, published May 20, 2010.
International Search Report dated May 12, 2010.

*Primary Examiner* — Mohammed Rehman
(74) *Attorney, Agent, or Firm* — Harness, Dickey & Pierce, P.L.C.

(57) ABSTRACT

Synchronous motors are controlled using a three-phase AC power controller. According to at least one embodiment of the invention, a fundamental wave having the desired frequency is defined for the first phase, and corresponding fundamental waves which have the same frequency as the frequency in the first phase but are out of phase by specific values are defined in the other phases. The triggering times during which the generated current pulse concurrently has the same polarity as the respective fundamental wave in two of the phases are determined for each phase and are used. Two of the three fundamental waves are generated in phase opposition when the desired frequency amounts to half the system frequency.

17 Claims, 3 Drawing Sheets

(56) References Cited

U.S. PATENT DOCUMENTS

| | | |
|---|---|---|
| 2003/0146722 A1 | 8/2003 | Griepentrog |
| 2005/0258788 A1* | 11/2005 | Mori et al. ............... 318/254 |
| 2005/0258796 A1* | 11/2005 | Kusaka ..................... 318/801 |
| 2006/0108969 A1 | 5/2006 | Han et al. |
| 2006/0158142 A1* | 7/2006 | Kurosawa et al. ......... 318/254 |
| 2006/0290303 A1* | 12/2006 | Oh et al. ................... 318/254 |
| 2008/0252242 A1* | 10/2008 | Akama et al. ........... 318/400.14 |

FOREIGN PATENT DOCUMENTS

| | | |
|---|---|---|
| EP | 1240712 B1 | 9/2003 |
| EP | 1667319 A2 | 6/2006 |
| JP | 55111688 A | 8/1980 |

\* cited by examiner

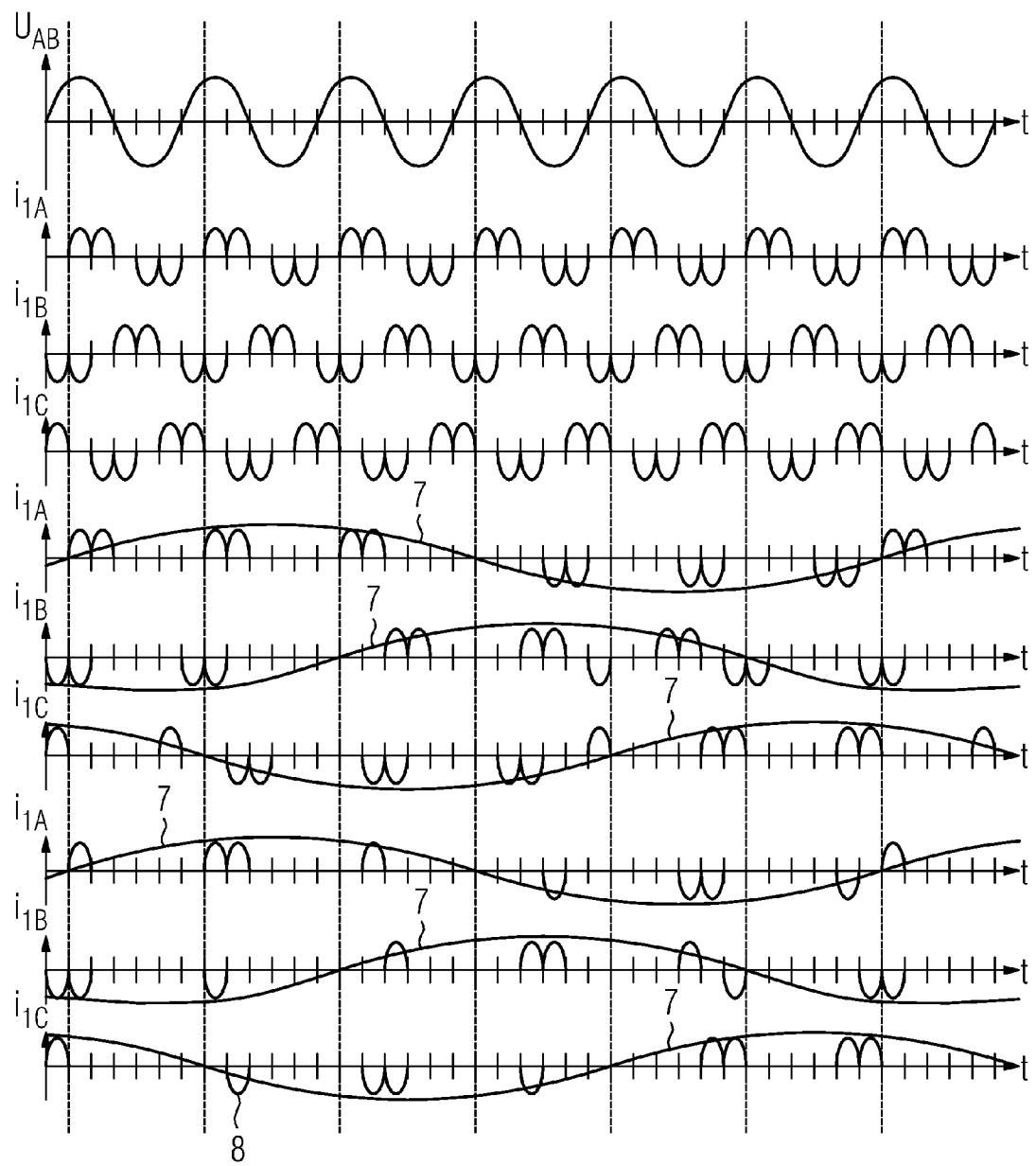

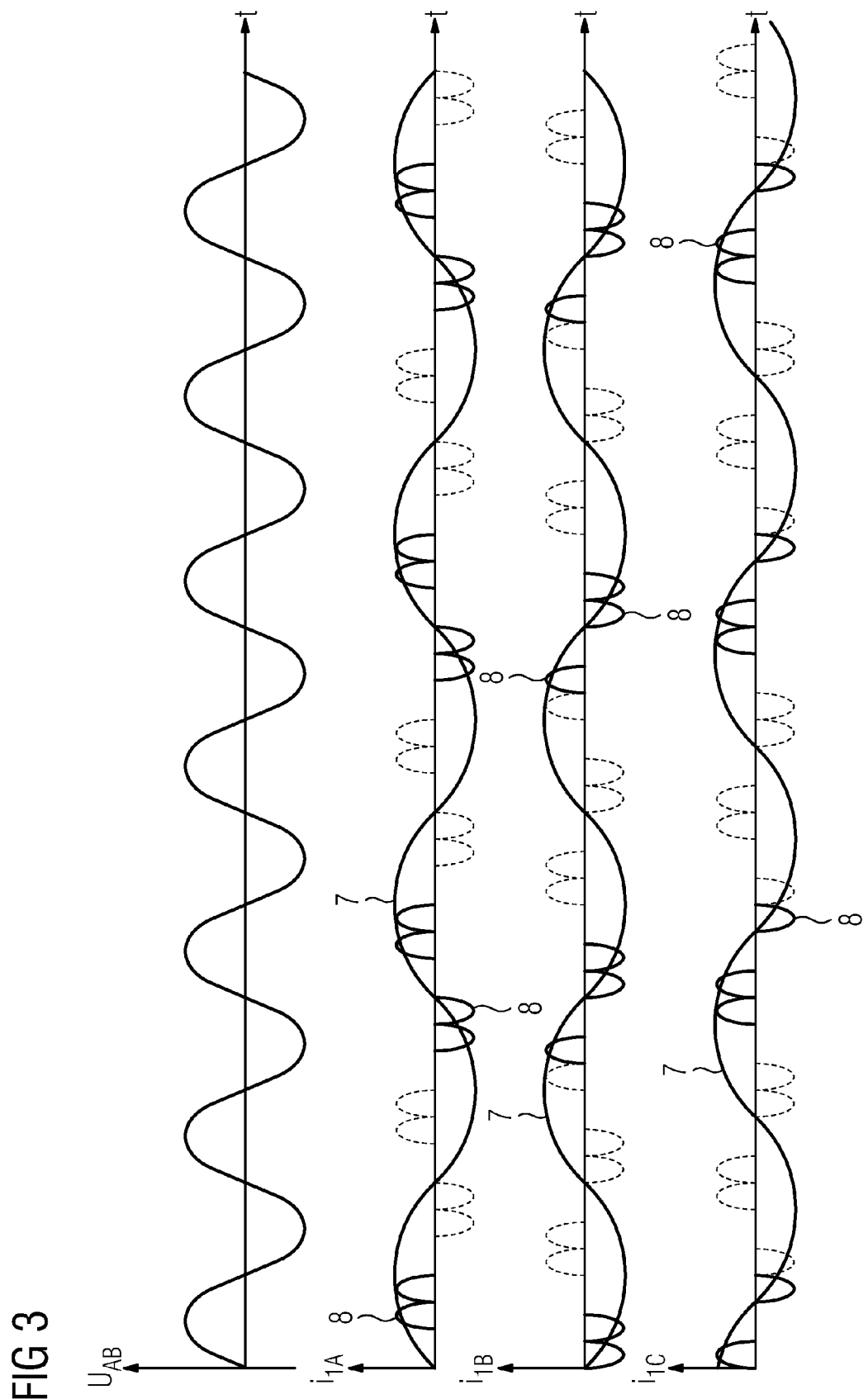

US 8,704,480 B2

METHOD FOR THE OPERATION OF SYNCHRONOUS MOTORS, AND ASSOCIATED DEVICE

PRIORITY STATEMENT

This application is the national phase under 35 U.S.C. §371 of PCT International Application No. PCT/EP2009/064372 which has an International filing date of Oct. 30, 2009, which designates the United States of America, and which claims priority on German patent application number DE 10 2008 057 701.4 filed Nov. 17, 2008, the entire contents of each of which are hereby incorporated herein by reference.

FIELD

At least one embodiment of the invention generally relates to a method and/or an associated device for operation of synchronous motors with three-phase polyphase controllers which are connected to a polyphase power supply system, preferably without connection of the star points of the stator winding of the synchronous motor and of the polyphase power supply system, and which comprise at least three pairs of semiconductor switching elements, for example thyristors connected back-to-back in parallel, which are triggered at specific times.

BACKGROUND

Polyphase synchronous motors without a starting cage are linked by the principle of operation to the frequency of the polyphase power supply system that feeds them. Motors such as these therefore cannot be started, that is to say accelerated, directly from the power supply system. In fact, a device which produces a variable-frequency voltage is required between the polyphase power supply system and the synchronous machine. A frequency converter is normally used for this purpose. The frequency converter consists of a rectifier, an intermediate circuit (capacitor) and an inverter.

SUMMARY

At least one embodiment of the invention specifies a method and/or a device which allow a synchronous machine to be operated from a polyphase power supply system with very little complexity in terms of power-electronic components. One aim in particular in this case is also to allow starting of the synchronous machine.

At least one embodiment is achieved by an operating method. Developments are specific in the dependent claims. An associated device for controlling a synchronous motor using the method is also specified.

A three-phase polyphase controller is used for the method according to at least one embodiment of the invention for operation of a synchronous motor. The polyphase controller is connected to a polyphase power supply system. The star points of the stator winding of the synchronous motor and of the polyphase power supply system are in this case preferably not connected. The polyphase controller comprises at least three semiconductor switching elements, expediently one thereof per phase. By way of example, the semiconductor switching elements may be alternating-current controllers, for example in the form of three pairs of thyristors connected back-to-back in parallel. The alternating-current controllers are activated or triggered, that is to say switched on, at specific times. In the case of thyristors, it is advantageous that they switch themselves off at the current zero crossing. However, it would also be possible to use IGBTs or other types of semiconductor switches.

A plurality of steps is carried out in the method according to at least one embodiment of the invention. In this case, a sinusoidal first fundamental is defined at one frequency, the frequency corresponding to the desired rotation speed of the motor, taking account of the number of pole pairs. In addition, two further fundamentals at the same frequency are defined. The further fundamentals are phase-shifted with respect to the first fundamental. In this case, there are at least two options for the frequency, which occur individually or in a time sequence:

a) the frequency is equal to the frequency of the power supply system voltage, and the further fundamentals are phase-shifted through 120° and 240° with respect to the fundamental. The phase angles of the fundamentals therefore form a "normal" polyphase system.

b) the frequency is equal to half the frequency of the power supply system voltage. Furthermore, the fundamentals have a phase shift with respect to one another which is not the same as the polyphase phase shift through 120° or 240°. For example, there is a phase shift of 180° between two of the fundamentals, while there is a phase shift of 240° between the third fundamental and the first fundamentals.

Furthermore, trigger times are selected, and are used to trigger the thyristors on which triggering at the same time for two of the phases would cause a current of the same polarity as the fundamental associated with the respective phase, wherein the trigger times occur at a specific trigger angle after the respective zero crossing of the power supply system voltage. In this case, the trigger angle therefore means the separation from the previous zero crossing.

For example, in the case of at least one embodiment of the invention, all the potentially possible trigger times which result for the zero crossing of the line voltage minus a trigger angle can be determined first of all. By way of example, potential trigger times result for the triggering of the thyristor pair in the outer conductor A when the phase angle of the feeding power supply system leads the zero crossing of the line voltage $U_{AB}$ or of the line voltage $U_{CA}$ by the trigger angle. In this case, the magnitude of the trigger angle is preferably between 120° and 150°. It is then possible to choose from the potential trigger times those for which there are two potential trigger times in two of the three phases at the same time.

Therefore, in other words, two of the three alternating-current controllers, that is to say thyristor pairs, are always triggered. In this case, by way of example, it is possible to trigger only one of the two thyristors for the thyristor pairs. Alternatively, both thyristors in a pair can always be triggered. This always results in current flowing from one of the phases into the other respective phase. The fundamentals of the two phases which are used at one time therefore always have opposite polarity at this time.

In particular, the described method is implemented in software. It can therefore easily be implemented in existing polyphase controllers, without additional component complexity.

The method according to at least one embodiment of the invention can be extended to further frequencies for the fundamentals, with the frequencies being equal to the power supply system frequency divided by k, where k≥1. In addition to the power supply system frequency and half the power supply system frequency, it is therefore also possible to produce one third, one quarter, etc. of the power supply system frequency. In this case, the phase angle of the first fundamental is preferably located such that the zero crossing of the first fundamental coincides with that of the power supply system voltage. The options for trigger times are governed by the relative position of the actual power supply system voltage and of the respective fundamental to be produced for the corresponding phase, and this advantageously results in a large number of possible trigger times when one of the fundamentals is synchronized to the power supply system voltage.

The method according to at least one embodiment of the invention is particularly advantageous when it is used for acceleration of the synchronous motor to its rated rotation speed. A sequence of at least two expediently rising frequencies is preferably used in this case. For example, a sequence of frequencies which each correspond to the power supply system frequency divided by a divisor k, where k passes through the following values: 15, 13, 11, 9, 7, 5, 4, 3, 2, 1, could be used for acceleration of a synchronous machine. In this case, it is preferable not to use all the integer values of k between the greatest value and unity. However, because of the greater absolute separation between the frequencies when the divisors k are small, it is advantageous for these values to include at least one third, half of the power supply system frequency and the power supply system frequency itself. Alternatively, all the integer divisors between the greatest used divisor and the divisor k=1 can also be used. In a further alternative, it is also possible to use non-integer divisors.

When switching between two frequencies, that is to say two synchronous rotation speeds for the synchronous machine, the synchronous machine must reach the increased rotation speed in a short time. This typically involves a greater or lesser number of oscillations, that is to say a variation in the rotor rotation speed about the synchronous rotation speed and oscillation of the rotor, associated with this, about its nominal position and, of course, this is itself time-dependent.

In order to limit the oscillation, it is advantageous to define a time for switching between two frequencies for the fundamentals, at which the switching involves as little oscillating torque as possible, and to carry out the switching at this time. By way of example, it is possible to use the time at which the angular position of the rotor corresponds to its nominal position as the time for switching to a higher frequency. There are two options for this precondition.

In one of these options, the rotor will in this case actually "overtake" its nominal position, that is to say it will rotate somewhat faster than the synchronous rotation speed. In the other option, it will rotate somewhat more slowly, and therefore actually falls back. If the first option is specifically and preferably used, that is to say switching is carried out when the rotor will actually exceed its nominal angular position in this case, then the difference between its instantaneous rotation speed and the rotation speed to be achieved is decreased in comparison to other times. Switching at this time leads to reduced oscillation.

The operation of the synchronous machine well below its rated rotation speed during acceleration results in the rotation of the rotor producing a lower opposing voltage in the stator than during rated operation. Considerably higher currents therefore flow in the stator, if the feed voltage is not reduced. For this reason, during acceleration, the voltage is generally readjusted at the converter, in proportion to the frequency. During operation on the polyphase controller, a reduced root mean square value of the voltage is preferably likewise achieved at the terminals of the machine by a change to the phase gating. When using k>2 divisors, the trigger angle of the thyristors is preferably for this purpose set relative to the zero crossing of the power supply system voltage such that the current which flows is as little as possible above the rated current of the synchronous machine. For example, wherever there are k>4 divisors, a large trigger angle can be used for this purpose, for example only 165°, while a lower trigger angle of, for example, 150° is used for all other divisors where k=1 . . . 4.

A further improvement to the acceleration of the synchronous machine can be achieved by setting the trigger angles after switching to an increased frequency for the fundamentals such that braking torques for the rotor are minimized. For this purpose, by way of example, the position of the rotor with respect to the current space vector may be evaluated in order to determine the torque. One factor in this case is that the polyphase field rotates faster than the rotor after switching the frequency of the fundamentals. This effect is particularly evident for small divisors k and is at its greatest when switching from half the power supply system frequency to the entire power supply system frequency, that is to say from the divisor k=2 to the divisor k=1 since the greatest absolute sudden frequency change occurs in this case, specifically of half the power supply system frequency.

During this switching process in particular, the rotor initially rotates only about half as fast as it should. Relative to the position of the rotor, the space vector of the stator currents which form the rotating field therefore initially passes quickly through all the possible angles, thus also resulting in a large number of times in which the rotor is even being braked, in addition to acceleration of the rotor.

In order to overcome this problem, it is possible, for example, to determine the current space vector and at the same time the rotor position. The rotor position can be determined, for example, by using a position transmitter which is provided in the synchronous machine. If the relative position is such that a positive torque can be expected, that is to say acceleration of the rotor, the trigger angle is set, for example, so as to achieve a high torque. This is done by selection of a large trigger angle, for example 40°. A positive torque is achieved when the current space vector does not lead the rotor too excessively with respect to the rotation direction, that is to say in the region of an angle of, for example, 30° with respect to the rotor position. In other words, a small control angle, for example of 15°, with a correspondingly small produced voltage and a small produced torque is chosen, when the rotor angle and the current space vector are unfavorably situated, that is to say when the current space vector follows the rotor position, that is to say is in the region of an angle of, for example, −60° with respect to the rotor position.

A device which is designed to carry out the described method has a polyphase controller comprising three alternating-current controllers, that is to say thyristor pairs connected back-to-back in parallel. Furthermore, a control device is provided, which can carry out the described method. By way of example, a voltage measurement device can be provided between two of the three connected phases in order to obtain the required input values. It is advantageous for a control unit, which is provided in the synchronous machine and is nowadays expediently in the form of a microprocessor, to control the polyphase controller. In this case, data is automatically available for example simply from a position transmitter integrated in the synchronous machine. Furthermore, a synchronous machine such as this may already have the polyphase controller, that is to say it may be in the form of an overall unit which can thus be directly connected to a polyphase power supply system.

BRIEF DESCRIPTION OF THE DRAWINGS

Preferred, but in no way restrictive, example embodiments of the invention will now be explained in more detail with reference to the drawings. In this case, the features are illustrated schematically, and corresponding features are marked with the same reference symbols. In this case, in detail, in the figures:

FIG. 2 shows diagrams to illustrate the trigger times, FIG. 3 shows diagrams to illustrate the trigger times at half the power supply system frequency.

DETAILED DESCRIPTION OF THE EXAMPLE EMBODIMENTS

Figure 1:
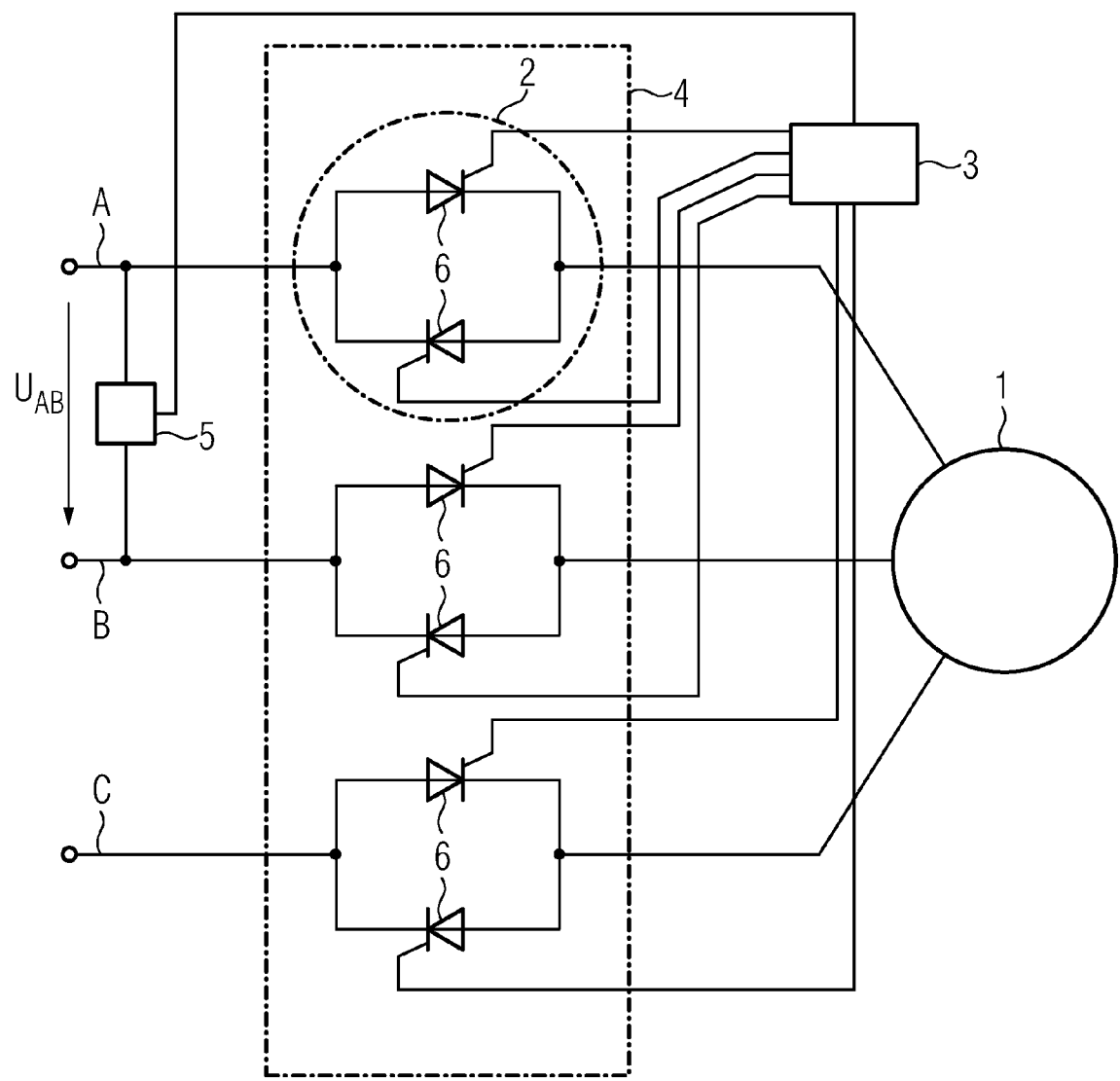
FIG. 1 shows a device for controlling a synchronous motor using the method according to an embodiment of the invention.

In FIG. 1, a polyphase synchronous machine 1 is connected to the phases A, B, C of a polyphase power supply system via a three-phase polyphase controller 4. Each of the phases has an associated thyristor pair 2 composed of two thyristors 6 connected back-to-back in parallel. The trigger electrodes of the thyristors 6 are connected to a control device 3, which provides the trigger signals required for triggering the thyristors 6, in a predetermined time sequence. The control device 3 also controls the phase gating angle. The control device 3 is preferably formed by a microcontroller. A voltage measurement device 5 is connected between two outer conductors of the power supply system, for example between the terminals A and B of the power supply system shown in FIG. 1, and the power supply system voltage $U_{AB}$, which occurs between these two terminals A and B, is produced at the output of the voltage measurement device 5.

In a first example embodiment, the control device 3 and the polyphase controller 4 are a unit which is separate from the polyphase synchronous machine 1, that is to say in the form of a separate motor control device. In a second example embodiment, the control device 3 and the polyphase controller are part of the polyphase synchronous machine 1. In this case, the functions of the control device 3 are expediently integrated in an already existing microprocessor in the polyphase synchronous machine 1.

In the present case, the control device 3 is used to run a suitable program, by which the device can be operated by software. This is based on a standard method, by which any desired parts of the rated rotation speed of the polyphase synchronous machine 1 can be reached.

FIG. 2 shows the resultant situation when one example embodiment option of the invention is used at a rotation speed of ⅙ of the rated rotation speed. In this case, the uppermost part of the diagram shows a sinusoidal waveform of the voltage $U_{AB}$ between the first and the second phases A, B. This waveform indicates the power supply system frequency, of course.

The second, third and fourth parts of the diagram each show three waveforms for the three currents in the phases A, B, C. In this case, the second part of the diagram indicates, from the top, the possible currents which would be achievable in the event of triggering at all the possible trigger times, in which case the current level is shown only schematically, and always the same. Corresponding to the input voltage in the respective phase, pairs of current pulses 8 in the positive and negative directions are possible alternately, with the normal offset of 120° being provided between the phases.

As shown from the top in the third part of the diagram, an (imaginary) fundamental 7 is now applied to each of the phases, with this fundamental 7 being at the frequency which corresponds to the desired rotation speed for the polyphase synchronous machine 1. This is based on ⅙ of the power supply system frequency. The typical phase offset of 120° for the individual phases of the polyphase system is produced between the fundamentals 7, with the phase offset being related to the frequency of the fundamentals 7. This part of the diagram now only shows, in addition to the fundamentals 7, the trigger times at which the resultant current flow has the same polarity as the fundamental 7 at the respective time and in the respective phase. This results in the disappearance of about half of the possible trigger times, since the fundamentals 7 cannot be synthesized by a current flow in the wrong direction.

In the lowermost part of the diagram are once again shown the fundamentals 7 for all three phases A, B, C. In addition, the current pulses 8 are now shown only for those trigger times for which a current pulse 8 of the correct polarity can be produced at the same time in two of the three phases. This once again results in some of the trigger times disappearing. The remaining trigger pulses, which are shown in this part of the diagram, are actually used, thus in the end synthesizing a current flow based on the fundamentals 7.

If the frequency is equal to half the power supply system frequency, then, when using the standard phase shifts of 120° and 240° between the fundamentals 7 for one of the phases, there are no potential trigger times for one current direction. If the synchronous machine is nevertheless operated in this way, then it is braked analogously to direct-current braking.

Thus, when using half the power supply system frequency, a different polyphase system is produced by selecting a phase shift of 180° between two of the phases, for example the phases A and B, once again with respect to half the power supply system frequency. This is illustrated together with the trigger times that then result, in FIG. 3. In order to assist clarity, FIG. 3 also shows the trigger pulses which are not used, represented by dashed lines.

When the power supply system frequency is used as the frequency for the fundamentals 7, it is possible to operate the synchronous machine directly from the power supply system without being influenced by the thyristors. However, trigger control is also used during rated operation, in order to regulate the current and the voltage. In this case, a normal polyphase system can once again be used for the phase angle of the fundamentals 7, that is to say a phase angle of 120° and 240° with respect to one another.

In order to accelerate the synchronous machine to the rated rotation speed, a sequence of frequencies is used for the fundamentals 7 in the present exemplary embodiment. One example of a sequence of frequencies is shown in the following table, which shows a respective divisor for the power supply system frequency for a rotation speed in revolutions per minute of an example of a synchronous machine, in which case the frequency for the fundamentals 7 then corresponds to the power supply system frequency divided by the divisor:

| | Divisor | | | | | | | | | |
|---|---|---|---|---|---|---|---|---|---|---|
| | 15 | 13 | 11 | 9 | 7 | 5 | 4 | 3 | 2 | 1 |
| Rotation speed | 50 | 58 | 68 | 83 | 107 | 150 | 188 | 250 | 375 | 750 |

In this case, it can be seen that the sudden change in the rotation speed is high, particularly when the divisors are small. Experimentally, it has been found that, when switching between half the power supply system frequency and the power supply system frequency as the frequency for the fundamentals 7, the synchronous machine cannot accelerate sufficiently quickly, and in the end becomes desynchronized and is braked.

In order to overcome this problem, additional regulation is used in this example, which ensures that torques which counteract acceleration of the rotor are minimized, that is to say that, as far as possible, only accelerating torques act after switching of the frequency.

For this purpose, in this example, the position of the stator current space vector on the rotor vector diagram is considered. In order to determine this for a synchronous machine, it is necessary to know on the one hand the position of the rotor and on the other hand the current flow in the phases. By way of example, an appropriate current measurement is provided for this purpose. Furthermore, a position transmitter is provided for the polyphase synchronous machine 1.

If it is evident from the position of the current vector relative to the rotor position that a positive torque can be expected in the sense of acceleration of the rotor, then, in this example, the trigger angle is set to a value $\alpha_{min}$, for example $\alpha_{min}=150°$. In other words, the thyristors are triggered 150° after a zero crossing of the voltage. Other values can also be used for $\alpha_{min}$, for example 130° or 110°. However, if a negative torque, that is to say a braking torque, can be expected on the basis of the position of the current vector relative to the rotor position, then a larger trigger angle, for example of $\alpha_{max}=167°$, is chosen. With a larger trigger angle, a lower current flows overall until the thyristor is switched off, and the resultant torque for the rotor becomes considerably less.

The additional regulation for the optimization of the torque is used in particular when switching from half the power supply system frequency to the power supply system frequency itself, but has an advantageous effect in all switching operations. When the rotation speed of the rotor of the synchronous machine reaches the rated rotation speed, then the additional regulation for the torque is expediently switched off.

In order in general to raise the motor torque, the triggering can be advanced, thus resulting in a longer current flow time for each triggering process. For example, a value of 140°, 130° or else 120° or less can be used for triggering in general, or for $\alpha_{min}$.

Furthermore, action is likewise taken on the trigger angles for divisors k>5. The control device 3 provides lower trigger angles for corresponding frequencies, that is to say for lower rotation speeds. For example, a value of $\alpha_{min}=165°$ can be provided for divisors k>7, a value of $\alpha_{min}=155°$ for divisors k from 4 to 7, and a value of $\alpha_{min}=145°$ for k<4. Overall, the control device 3 therefore expediently regulates the value for the trigger angle for all divisors, on the one hand as a function of the instantaneous synchronous rotation speed, that is to say the frequency of the fundamentals 7, and on the other hand, as a function of the instantaneously resultant torque.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for operation of a synchronous machine including a three-phase polyphase controller, connected to a polyphase power supply system and including at least three semiconductor switching elements which are switched on at specific times, the method comprising:
  defining a sinusoidal fundamental at a frequency which corresponds to the desired rotation speed of the synchronous machine;
  defining of two further fundamentals at the same frequency, which are phase-shifted with respect to the first fundamental, wherein
    a) a first option includes the frequency being equal to the frequency of the power supply system voltage, with the further fundamentals being phase-shifted through 120° and 240° with respect to the fundamental, or
    b) a second option includes the frequency being equal to half the frequency of the power supply system voltage, with the fundamentals including a phase shift with respect to one another which is not the same as the polyphase phase shift through 120° or 240°,
  wherein the first and second options for the frequency occur individually or in a time sequence; and
  selecting and using trigger times for triggering, at which triggering at a same time for two of the phases would cause a current of the same polarity as the fundamental associated with the respective phase, wherein the trigger times occur at a specific trigger angle after the respective zero crossing of the power supply system voltage.

2. The method as claimed in claim 1, wherein a pair of the fundamentals include a phase shift of 180° with respect to one another at half the frequency of the power supply system voltage.

3. The method as claimed in claim 2, wherein the power supply system frequency divided by k is used as the frequency for the fundamentals, where k≥1.

4. The method as claimed in claim 3, wherein the zero crossing of the fundamental is synchronized with the power supply system voltage.

5. The method as claimed in claim 1, wherein the power supply system frequency divided by k is used as the frequency for the fundamentals, where k≥1.

6. The method as claimed in claim 5, wherein the zero crossing of the fundamental is synchronized with the power supply system voltage.

7. The method as claimed in claim 5, wherein the trigger angle of the thyristors is set relative to the zero crossing of the power supply system voltage when k>2 such that the current which flows is as little as possible above the rated current of the synchronous machine.

8. The method as claimed in claim 1, wherein a sequence of at least two frequencies is used to accelerate the synchronous machine to its rated rotation speed.

9. The method as claimed in claim 8, wherein the sequence contains a third and half of the power supply system frequency, as well as the power supply system frequency itself.

10. The method as claimed in claim 1, wherein a time at which switching involves as little oscillating torque as possible is defined for switching between two frequencies for the fundamentals, and wherein switching takes place at the time.

11. The method as claimed in claim 10, wherein the time at which the angular position of the rotor corresponds to its nominal position is used as the time for switching to a higher frequency.

12. The method as claimed in claim 1, wherein after switching to a higher frequency for the fundamentals, the trigger angles are set such that braking torques for the rotor are minimized.

13. The method as claimed in claim 7, wherein the position of the rotor with respect to the current space vector is evaluated in order to determine the magnitude of the torque.

14. A device for operation of a synchronous machine, comprising:
  a three-phase polyphase controller, connectable to a polyphase power supply system and including at least three pairs of thyristors connected back-to-back in parallel; and
  a control unit to control the thyristors, designed to carry out defining a sinusoidal fundamental at a frequency which corresponds to the desired rotation speed of the synchronous machine;

defining two further fundamentals at the same frequency, which are phase-shifted with respect to the first fundamental, wherein a) a first option includes the frequency being equal to the frequency of the power supply system voltage, with the further fundamentals being phase-shifted through 120° and 240° with respect to the fundamental, or b) a second option includes the frequency being equal to half the frequency of the power supply system voltage, with the fundamentals including a phase shift with respect to one another which is not the same as the polyphase phase shift through 120° or 240°, wherein the first and second options for the frequency occur individually or in a time sequence; and selecting and using trigger times for triggering, at which triggering at a same time for two of the phases would cause a current of the same polarity as the fundamental associated with the respective phase, wherein the trigger times occur at a specific trigger angle after the respective zero crossing of the power supply system voltage.

15. The device as claimed in claim 14, wherein the control unit is a microprocessor provided for the synchronous machine.

16. The device as claimed in claim 15, wherein the synchronous machine includes a position transmitter.

17. The device as claimed in claim 14, wherein the synchronous machine includes a position transmitter.

* * * * *